United States Patent [19]

Okada et al.

[11] Patent Number: 5,266,502
[45] Date of Patent: Nov. 30, 1993

[54] STM MEMORY MEDIUM

[75] Inventors: Takao Okada, Hachioji; Hiroshi Kajimura, Tokyo, both of Japan

[73] Assignee: Olympus Optical Co., Ltd., Tokyo, Japan

[21] Appl. No.: 678,597

[22] Filed: Apr. 1, 1991

[30] Foreign Application Priority Data

Apr. 3, 1990 [JP] Japan ................................. 2-87474

[51] Int. Cl.⁵ .......................................... H01L 21/265
[52] U.S. Cl. .......................................... 437/24; 437/52
[58] Field of Search ................................. 437/24, 52

[56] References Cited

U.S. PATENT DOCUMENTS

| | | | |
|---|---|---|---|
| 4,262,056 | 4/1981 | Hubler et al. | 437/24 |
| 4,948,742 | 8/1990 | Nishimura et al. | 437/24 |
| 4,968,636 | 11/1990 | Sugawara | 437/24 |

FOREIGN PATENT DOCUMENTS

| | | | |
|---|---|---|---|
| 57-211749 | 12/1982 | Japan | 437/24 |
| 58-60556 | 4/1983 | Japan | 437/24 |
| 64-37029 | 2/1989 | Japan | 437/24 |

OTHER PUBLICATIONS

Binning et al., Physical Review Letters-vol. 49-No. 1-Jul. 5, 1982 Surface Studies by Scanning Tunneling Microscopy.
IBM J. Res. Develop., vol. 30, No. 4, Jul. 1986, "Spectroscopy of electronic states of metals with a scanning tunneling microscope", Kaiser et al., pp. 411–416.
Binning et al., IBM J. Res. Develop., vol. 30, No. 4, Jul. 1986, "Scanning tunneling microscopy" pp. 355–369.
de Lozanne et al., "Spatial Variations in the Superconductivity of $Nb_3Sn$ ... " Physical Review Letters, vol. 54, No. 22, 3 Jun. 1985 pp. 2433–2436.
Hamers et al., "Surface Electronic Structure of S;(111)-(7x7) Resolved in Real Space", Physical Review Letters, vol. 56, No. 18, 5 May 1986 pp. 1972–1975.
Kuk et al-Rev. Sci. Instrum. 60(2), Feb. 1989 "Scanning tunneling microscope instrumentation", pp. 165–180.
J. Vac. Sci. Technol. A6(2), Mar./Apr. 1988, "Scanning tunneling spectroscopy study on graphite and $2H-NbSe_2$", Bando et al., pp. 344–348.
Marchon et al., "Atomic Arrangement of Sulfur Adatoms ... ", Physical Review Letters, vol. 60, No. 12, 21 Mar. 1988, pp. 1166–1169.

Primary Examiner—Olik Chaudhuri
Assistant Examiner—Ourmazd S. Ojan
Attorney, Agent, or Firm—Frishauf, Holtz, Goodman & Woodward

[57] ABSTRACT

An STM memory medium comprising a substrate whose surface is smooth or even, a first insulating layer formed at a predetermined depth in the substrate by implanting first ion atoms from the smooth surface of the substrate into it under a certain condition, and a second insulating layer formed adjacent to the first insulating layer and at another predetermined depth in the substrate by implanting second ion atoms from the smooth surface of the substrate into it under another certain condition.

2 Claims, 5 Drawing Sheets

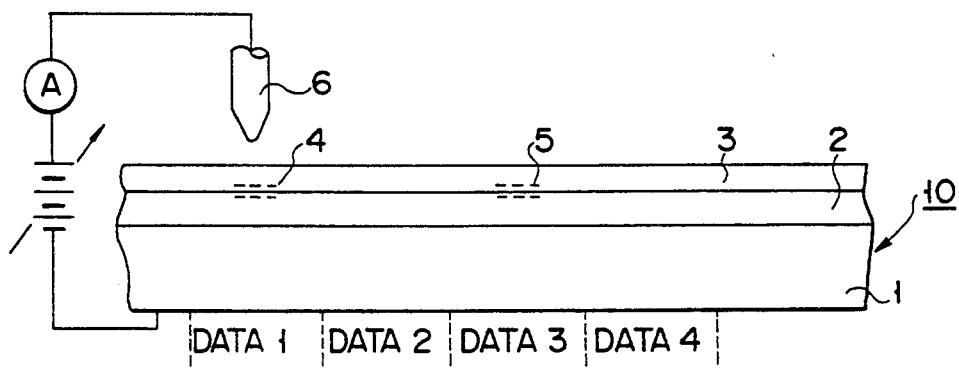
F I G. 1
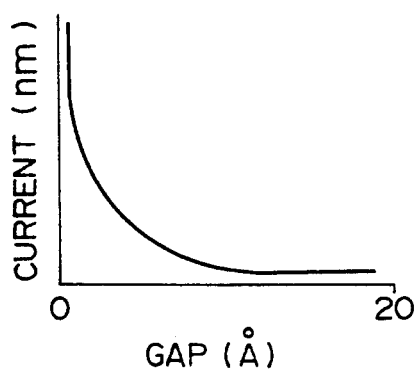
F I G. 2A
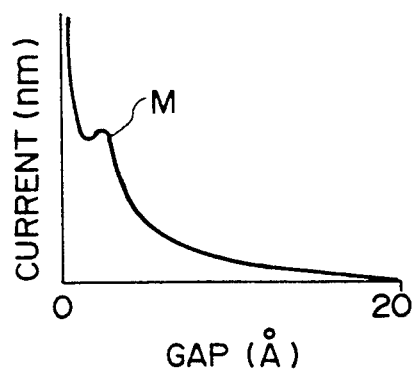
F I G. 2B

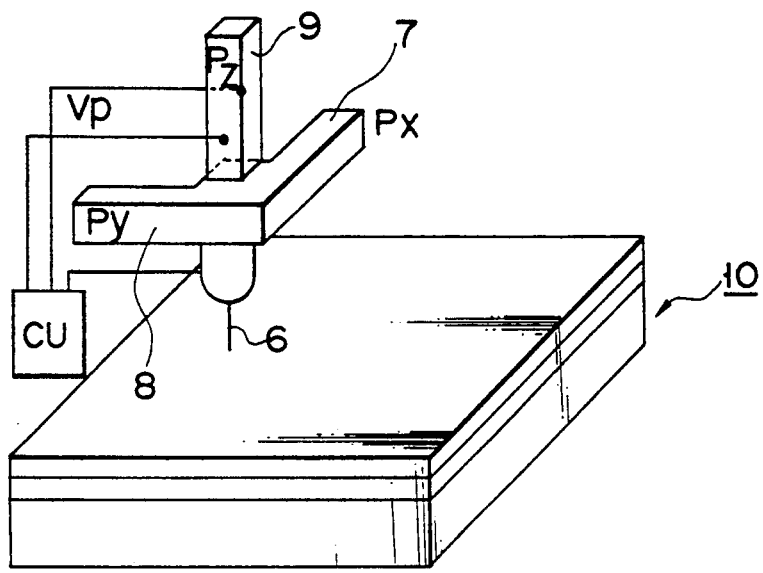
F I G. 3
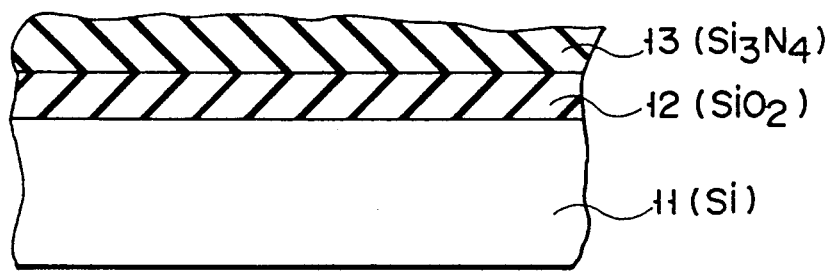
F I G. 4

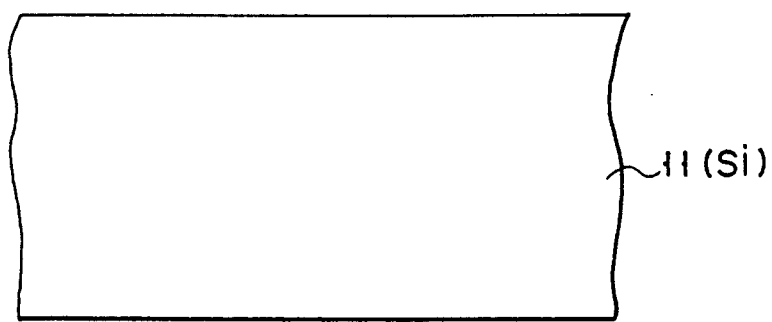
F I G. 5A
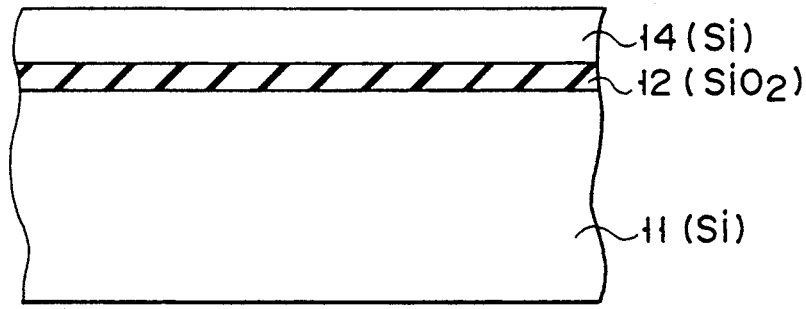
F I G. 5B
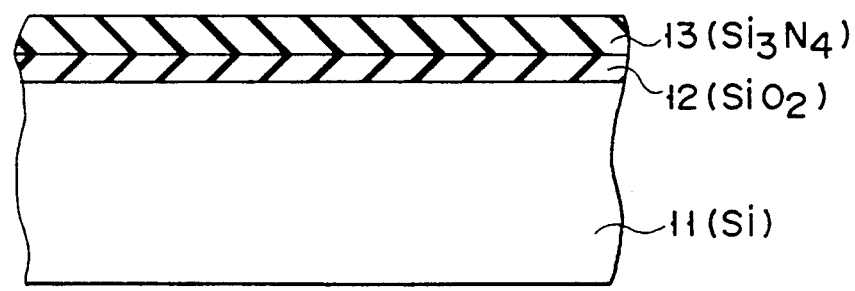
F I G. 5C

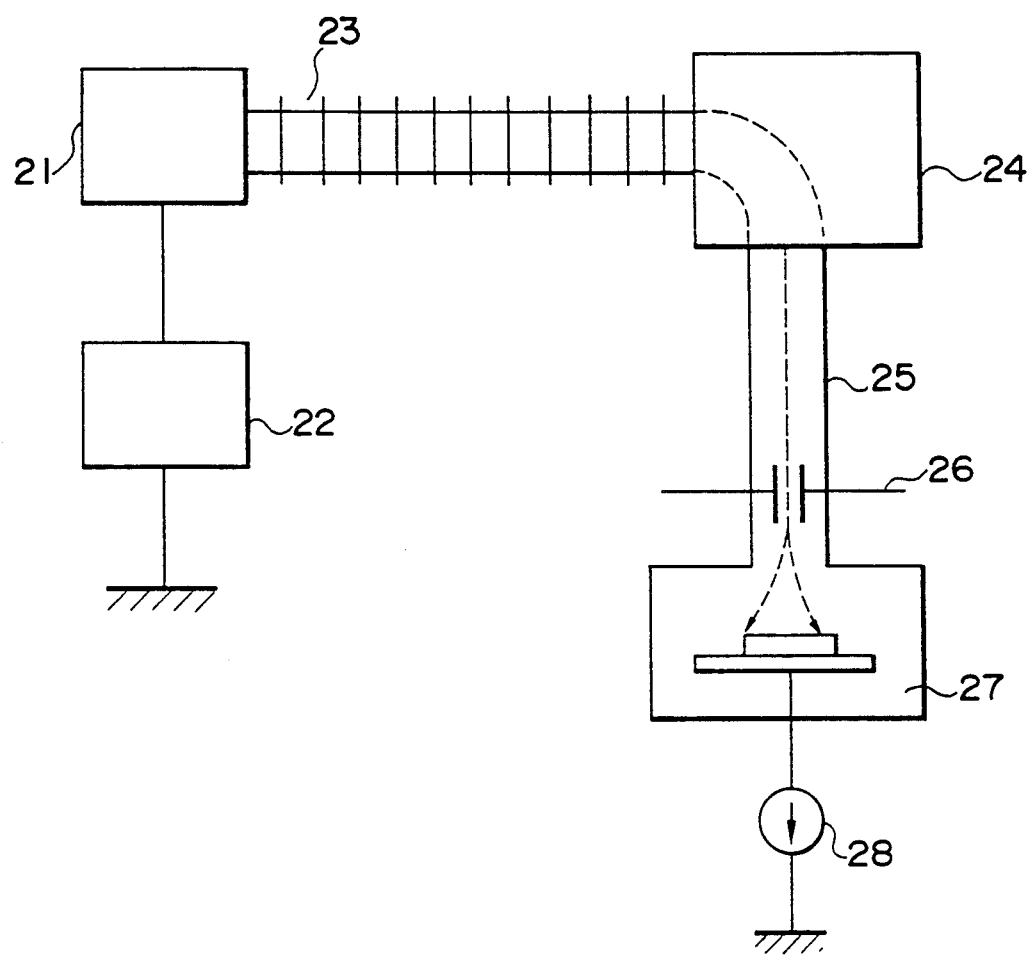
F I G. 6

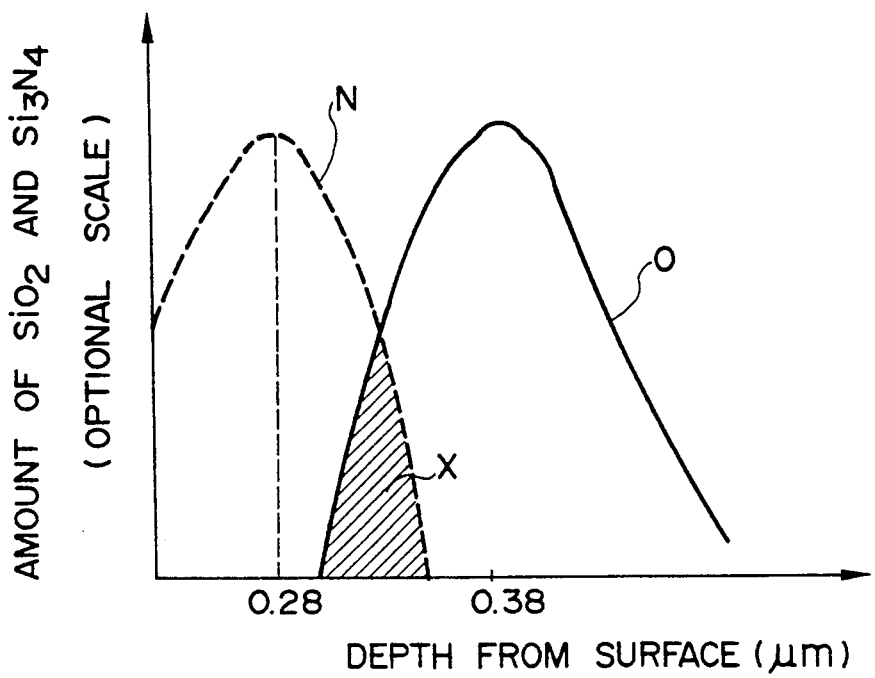
F I G. 7A
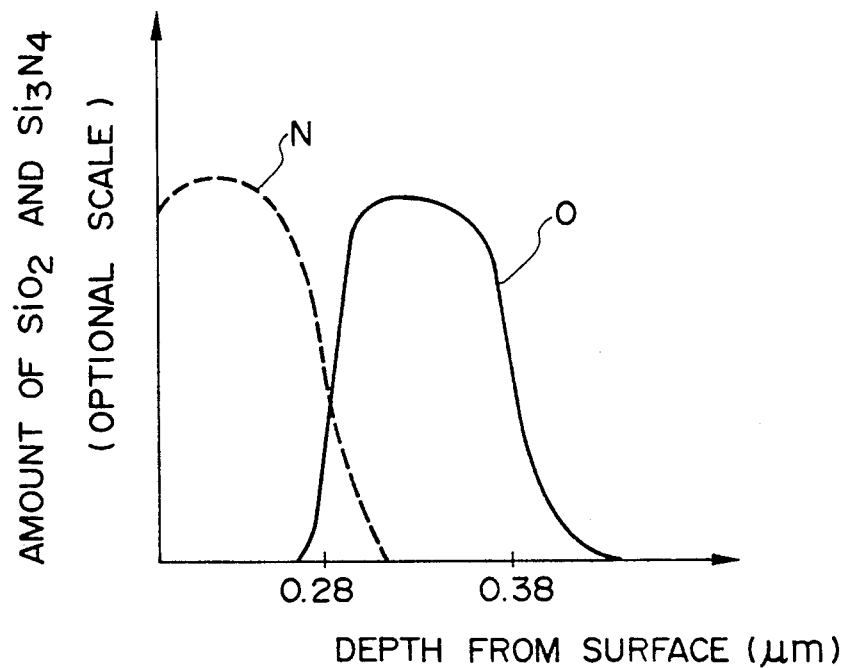
F I G. 7B

STM MEMORY MEDIUM

BACKGROUND OF THE INVENTION

1. Field of the Invention

The present invention relates to an STM memory medium and, more particularly, an STM memory medium whose surface smoothness or evenness is remarkably enhanced. It also relates to a method of manufacturing such STM memory medium.

2. Description of the Related Art

STM (or scanning tunnel microscope) has a resolution of atomic size (Binning et al., "Surface Studies By Scanning Tunneling Microscopy". Physical Review Letters, Vol. 49, No. 1, pages 57–61, 1982). An ultra-high density memory which uses this STM as the input/output means has been proposed (U.S. Pat. No. 4,575,822).

FIG. 1 shows the above-proposed STM memory medium 10. Reference numeral 1 in FIG. 1 represents a semiconductor substrate made of silicon, for example. First and second insulating films 2 and 3 are laminated on the semiconductor substrate 1. Silicon oxide and nitride films, for example, are used as these insulating films 2 and 3. Information is written by selectively storing electric charges 4 and 5 at the interface between the insulating films 2 and 3. A probe 6 of the STM is used to write information, and the electric charges 4 and 5 are stored by creating tunnel current at the interface between the insulating films 2 and 3.

Information is written not at areas Data 2 and 4 but at areas Data 1 and 3 in FIG. 1. When tunnel current is monitored by the STM probe 6 under such a recording state as shown in FIG. 1, a characteristic curve shown in FIG. 2A is obtained at each of the Data 2 and 4 areas where no information is written, and a characteristic curve shown in FIG. 2B is obtained at each of the Data 1 and 3 areas where information is written. By detecting whether or not a peak M is present, it is possible to determine whether or not information is written and reading of the information can be achieved.

FIG. 3 shows the STM device used to carry out the writing and reading of information. As shown in FIG. 3, the STM probe 6 is attached to actuators 7, 8 and 9 which are moved in directions x, y and z respectively, and scanning is carried out according to the servo-system by adding voltage to these actuators.

According to this STM memory system, an ultra-high density memory can be realized because the STM has the resolution of atomic size. More specifically, writing and reading of 1 bit can be carried out at an area of 10 nm × 10 nm, and this enables a memory density of 100 Mbits/cm$^2$ to be realized.

The above-described STM memory medium 10 is manufactured according to the following method. As shown in FIG. 4, the surface of an Si wafer 11 is heat-oxidized to form an SiO$_2$ layer 12 and an Si$_3$N$_4$ layer 13 is then formed by chemical vapor deposition ("CVD"). This conventional STM memory medium has the following drawbacks.

The tunnel gap in the STM memory is on the order of a nano-meter and the memory medium used is thus required to have a surface smoothness or evenness of a nano-meter. This is because the scanning of the STM probe 6 at the time when information is written and read is carried out by the servo-system in such a way that voltage is applied to the actuators, to which the probe 6 is attached, so as to keep tunnel current constant, and because the normal distribution of electric charges cannot be read correctly when the surface un-evenness of the memory medium is substantial. This is also because the scanning cannot be carried out at high speed even if information could be written and read.

According to the conventional manufacturing method which has been described above referring to FIG. 4, the top layer 13 of Si$_3$N$_4$ is formed by the CVD. The surface of this Si$_3$N$_4$ layer 13 is thus made relatively rough, as shown in FIG. 4, thereby making it impossible that the Si$_3$N$_4$ layer 13 has such surface smoothness or evenness of nano-meter order as is needed.

SUMMARY OF THE INVENTION

An object of the present invention is to provide an STM memory medium which has a remarkably higher surface smoothness or evenness as compared with conventional ones.

Another object of the present invention is to provide a method of manufacturing the STM memory medium which can have such remarkably higher surface smoothness as described above.

The first object of the present invention can be achieved by an STM memory medium comprising a substrate whose surface is smooth or even, a first insulating layer formed at a certain depth in the substrate by implanting first ion atoms from the smooth surface of the substrate into it under a predetermined condition, and a second insulating layer formed at another certain depth adjacent to the that of the first insulating layer in the substrate by implanting second ion atoms from the smooth surface of the substrate into it under another predetermined condition.

A layer of silicon oxide, for example, can be used as the first insulating layer while a layer of silicon nitride, for example, as the second insulating layer. The STM memory medium using these silicon oxide and nitride layers can be manufactured as follows.

Oxygen is ion-implanted into the silicon substrate 11 shown in FIG. 5A and then heat-annealed to form the silicon oxide layer 12 at a position in the substrate 11 which is separated from the surface of the silicon substrate 11 by a certain depth. As the result, a silicon layer 14 having a certain thickness is left on the silicon oxide layer 12. Nitrogen is then ion-implanted into the remaining silicon layer 14 and heat-annealed to convert the silicon layer 14 into the silicon nitride layer 13, so that a memory interface can be formed between the silicon nitride and oxide layers.

It may be arranged that nitrogen is ion-implanted at first to form the silicon nitride layer 13 and that oxygen is then ion-implanted to form the silicon oxide layer 12.

A double-memory medium can also be made when the ion-implantation and the heat-annealing are similarly applied to silicon substrate 11 from the back thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 through 3 are intended to explain the fundamental theory of the STM memory;

FIG. 4 is a sectional view showing the STM memory medium made by the conventional method;

FIGS. 5A through 5C are sectional views successively showing the process of manufacturing an STM memory medium according to the present invention;

FIG. 6 shows an example of the ion implanting apparatus employed by the present invention; and FIGS. 7A and 7B are graphs showing distributions of $Si_3N_4$ and $SiO_2$ in the STM memory medium manufactured according to an embodiment of the present invention.

DETAILED DESCRIPTION OF THE PREFERRED EMBODIMENT

In order to form the silicon oxide layer which serves as the memory interface, the present invention employs the SIMOX method (Separation by Implanted Oxygen) which has been already used at the LSI process (K. Izumi et al., Electron Letters, Vol. 14, No. 18, pages 593-594, 1978). The SIMOX method is used to form the structure of SOI (Semiconductor on Insulator in a broad sense, and Silicon on Insulator in a narrow sense) which is useful as elements isolation. The ion implanting apparatus shown in FIG. 6, for example, is used by this method. As shown in FIG. 6, the apparatus comprises an ion source 21 for ionizing $O_2$ or $N_2$ gas by hot cathode discharge, a high voltage power source 22 for the ion source 21, an accelerating system 23 for drawing ions out of the ion source 21 and accelerating them, a mass spectroscope system 24 for selecting only those ions which are needed, a system 25 for focusing the ion beam, a deflecting system 26 for implanting ions uniformly into the surface of a sample, a sample system 27 having a means for holding and heating an Si wafer, and a current meter 28 for detecting the amount of oxygen or nitrogen ions implanted.

The SIMOX method can be described in more detail as follows. Oxygen ions ($^{16}O^+$) are implanted into the silicon substrate 11 with a predetermined accelerating voltage, using the apparatus shown in FIG. 6, and the silicon substrate 11 thus ion-implanted is annealed at about 1000° C. The $SiO_2$ layer 12 of Gaussian distribution density having a density peak at the predetermined depth (about 0.3 μm) from the top surface of the substrate 11 and a predetermined sweep range is thus formed as shown in FIG. 5B. As a result, the same substrate as one obtained when an Si epitaxial layer is newly formed on the $SiO_2$ layer 12 can be created.

Generally speaking, when accelerated ions (1–100 keV) are implanted into the crystal substrate, substrate-composing atoms usually interact with the implanted ions, thereby causing one of the following phenomena.

1) The implanted ions collide with crystal-composing atoms and enter deep into the substrate while losing their energy;

2) The energy of the implanted ions is transferred to electrons of the substrate-composing atoms to emit light, X-rays or electrons themselves;

3) The implanted ions collide with the crystal-composing atoms and the substrate-composing atoms are displaced;

4) The implanted ions are scattered backward by the substrate-composing atoms (back scattering); and 5) The implanted ions sputter the substrate-composing atoms, which are present near the top surface of the substrate, out of the substrate (sputtering).

The SIMOX method uses the phenomenon 1). More specifically, ions accelerated and implanted into a solid lose their energy gradually because of their nuclear collision against solid-composing atoms and interaction with the electron cloud enclosing the atomic nuclei, and finally came to a standstill at a certain position in the solid. This position in the solid where the implanted ions stand-still follows the Gaussian distribution which can be expressed by the following formula.

$$c(x) \propto \frac{1}{\sqrt{2\pi} \cdot \Delta Rp} \exp[-(x - Rp)^2/2\Delta Rp^2]$$

wherein $R_p$ represents an average projection range, and $\Delta R_p$ represents a standard deviation in the distribution of stand-stilling ions spread around the $R_p$.

In fact, the mass difference between the implanted ions and the substrate-composing atoms is large, however, asymmetry of the ions distributed left and right the projection range becomes remarkable. Namely, the distribution in the depth direction of the ions rises quickly but falls slowly after its peak.

Impurity atoms doped into the substrate are electrically inactive when they are left ion-implanted. Therefore, heat is added to the substrate to again crystallize the non-crystal layer of the substrate. The impurity atoms implanted are thus seated on their lattice positions to become electrically active. In addition, the annealing of the insulating material enables the distribution of the ions to be made smooth by virtue of diffusion. The pulse laser, continuously-oscillating laser, lamp and high temperature furnace methods are well-known as methods for heat-treating the substrate.

After the $SiO_2$ layer 12 shown in FIG. 5B is formed by the above-described SIMOX method, nitrogen ions ($^{14}N^+$) are then implanted into the remaining Si layer 14 with a predetermined accelerating voltage. When the substrate is annealed at about 1200° C., Si is nitrided and the Si layer 14 is converted into the $Si_3N_4$ layer 13. The STM memory structure having the charge-trapping interface of $SiO_2/Si_3N_4$ can be thusly formed.

The surface smoothness or evenness of the STM memory medium of $Si_3N_4$ layer 13 (second insulating layer) finally obtained according to the present invention is substantially equal to that of the silicon wafer 11 used. The silicon wafer 11 can be ground by mirror grinding, for example, to have an extremely high surface smoothness, that is, a surface smoothness of a nano-meter. According to the present invention, a memory medium having a quite high surface smoothness as needed for the STM memory can be obtained.

The substrate of the present invention is excellent in its surface smoothness. When the STM probe approaches the substrate in the order of a nano-meter and information voltage is applied to the substrate, tunnel current is allowed to flow through the first insulating layer of the substrate. A part of the electric charge of this tunnel current is trapped by the second insulating layer. This electric charge thus trapped forms a piece of recorded information. When reading of the recorded information is to be conducted, a change in the tunnel current is outputted under an STM mode and cantilever movement is outputted under an AFM mode relative to the approaching probe.

EXAMPLE 1

The STM memory medium was manufactured as follows, using the ion implantation apparatus shown in FIG. 6.

$^{16}O^+$ were ion-implanted into an Si wafer, which had a diameter of 3 inches and a thickness of 350 $\mu$m, under a condition that ion implantation energy was 150 keV and that the amount of dose was $1.2 \times 10^{18}$ cm$^{-2}$. The Si wafer thus ion-implanted was heat-treated in an atmosphere of $N_2$ of 1150° C. for two hours. As the result, an $SiO_2$ distribution represented by a curve O in FIG. 7A was obtained. $^{14}N^+$ were then ion-implanted into the Si wafer from the same surface of the wafer as the oxygen ions were implanted, under another condition that ion implantation energy was 10 KeV and that the amount of dose was $1 \times 10^{17}$ cm$^{-2}$. The Si wafer was heat-treated in an atmosphere of $N_2$ of 1200° C. for one hour. An $Si_3N_4$ distribution represented by a curve N in FIG. 7A was thus obtained.

It was found that the Gaussian distribution denoted by X in FIG. 7A could be varied by changing the ion implanting condition of $^{16}O^+$ and $^{14}N^+$ and/or the heat-treating condition. This is advantageous for adjusting the charge trapping characteristic at the interface between $SiO_2$ and $Si_3N_4$. When the wafer is annealed at low temperature (900° C.) for a long time (one hour) by continuous laser oscillation, for example, the $Si_3N_4$ and $SiO_2$ distributions can be changed as denoted by curves N and O in FIG. 7B.

The surface of the Si wafer was checked after the implantation of $^{16}O^+$ and $^{14}N^+$. It was found that surface smoothness of the Si wafer was the same as before the ion implantations. As a result, it was found that the STM memory medium obtained as described above could have such surface smoothness as is needed.

Using the memory medium obtained as described above and having the structure of $Si_3N_4/SiO_2/Si$, electric charge was injected into the interface of $Si_3N_4/SiO_2$ of the medium at a tunnel bias voltage of 1 V and with a tunnel gap of 15A. The surface of the wafer was then scanned by the STM probe at a tunnel bias voltage of 0.1 V and with a tunnel gap of 15A, thereby measuring its STM image. As a result, tunnel current quickly rose more than 50% at those areas of the wafer where electric charge was injected, and it was confirmed that the electric charge was injected into the interface of $Si_3N_4/SiO_2$.

Further, when the scanning speed of the probe was set at 5 Hz in the course of the STM scanning, the probe did not come into contact with the memory medium. On the contrary, in the case of the conventional STM memory medium whose $Si_3N_4$ film was formed by the CVD method, even when the STM scanning speed was set not lower than 0.1 Hz to write and read information, the probe came into contact with the memory medium.

According to the present invention as described above in detail, an STM memory medium having the structure of $Si_3N_4/SiO_2/Si$ in which the surface smoothness of the $Si_3N_4$ layer is extremely high can be provided. In addition, the following advantages can be attained.

Writing and reading of information can be conducted at a higher speed because the surface smoothness of the $Si_3N_4$ layer is excellent.

The batch production of the STM memory media is made possible because the ion implantation is used.

The interface of $Si_3N_4/SiO_2$ can be formed at a desired depth in the wafer by adjusting the condition of the ion implantation.

A double-memory medium can be obtained because the structure of $Si_3N_4/SiO_2$ can be formed on both top and bottom sides of the Si substrate.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of making the STM memory medium comprising the steps of:
    polishing a surface of a silicon substrate for obtaining a mirror finished surface;
    forming a silicon oxide layer in said silicon substrate, which layer is spaced from the surface of the silicon substrate so that a silicon layer is between the silicon oxide layer and the surface of said silicon substrate, by ion-implanting oxygen into the silicon substrate and then heat-annealing it; and
    converting said silicon layer into a silicon nitride layer for forming a memory interface between the silicon nitride layer and the silicon oxide layer, by ion-implanting nitrogen into said silicon layer and then heat-annealing it.

2. A method of making the STM memory medium comprising:
    polishing a surface of a silicon substrate for obtaining a mirror finished surface;
    forming a silicon nitride layer next to a surface of said silicon substrate, by ion-implanting nitrogen into the silicon substrate and then heat-annealing it; and
    forming a silicon oxide layer in said silicon substrate so that the silicon nitride layer is between said surface and said silicon oxide layer to form a memory interface between the silicon nitride layer and the silicon oxide layer by ion-implanting oxygen into the silicon substrate through the silicon nitride layer and then heat-annealing it.

* * * * *